United States Patent [19]
Viola

[11] Patent Number: 5,626,209
[45] Date of Patent: May 6, 1997

[54] CENTER PULL BICYCLE BRAKE ASSEMBLY

[76] Inventor: Barry J. Viola, 5 Valley Rd., Arkansas City, Kans. 67005

[21] Appl. No.: 579,852

[22] Filed: Dec. 26, 1995

[51] Int. Cl.$^6$ .................................................. B62L 3/00
[52] U.S. Cl. .................................. 188/24.14; 188/24.21
[58] Field of Search .......................... 188/24.21, 24.16, 188/24.11, 24.12, 24.13, 24.14, 24.15, 24.19, 343, 24.22, 2 D, 72.2, 73.42

[56] References Cited

U.S. PATENT DOCUMENTS

| | | | |
|---|---|---|---|
| 735,113 | 8/1903 | Kelland et al. | 188/24.21 |
| 2,460,204 | 1/1949 | Vacher | 188/24.21 |
| 3,114,434 | 12/1963 | Pletscher | 188/24.14 |
| 3,809,187 | 5/1974 | Grieve | 188/24.14 |
| 4,036,328 | 7/1977 | Hoffman et al. | 188/72.2 |
| 4,055,235 | 10/1977 | Tanaka et al. | 188/72.2 |
| 4,391,352 | 7/1983 | Brown | 188/24.12 |
| 4,765,443 | 8/1988 | Cunningham | 188/24.19 |
| 4,869,351 | 9/1989 | Romano | 188/2 D |
| 5,005,675 | 4/1991 | Pletscher | 188/72.2 |
| 5,299,664 | 4/1994 | Peters | 188/24.15 |

FOREIGN PATENT DOCUMENTS

| | | | |
|---|---|---|---|
| 018985 | 8/1914 | France | 188/24.21 |
| 0571341 | 5/1924 | France | 188/24.21 |
| 0898290 | 4/1945 | France | 188/24.21 |
| 0912209 | 8/1946 | France | 188/24.21 |
| 1000765 | 2/1952 | France | 188/24.21 |
| 0403907 | 12/1948 | Italy | 188/24.21 |
| 0438004 | 7/1949 | Italy | 188/24.21 |
| 276755 | 7/1927 | United Kingdom | 188/24.21 |
| 593664 | 10/1947 | United Kingdom | 188/24.21 |
| 1124883 | 8/1968 | United Kingdom | 188/24.21 |
| 2217408 | 10/1989 | United Kingdom | 188/24.21 |

*Primary Examiner*—Douglas C. Butler
*Attorney, Agent, or Firm*—Phillip A. Rein

[57] ABSTRACT

A center pull bicycle brake assembly readily mounted on a racing bicycle assembly to apply braking action through brake pad members against outer side walls of a front tire member by use of in a conventional hand operated bicycle actuator handle member. The center pull bicycle brake assembly includes a dual acting brake contact caliper assembly having a cam actuated caliper member pivotally connected to a brake contact caliper member. The brake contact caliper members are readily adjustable to place the brake pad members in a close but spaced condition relative to the front tire member. An actuator cable member is connected to a cam actuator body member which is operable to contact and move spaced ones of cam roller members operable to 1) pivot and move the brake contact caliper members towards a braking operation; and 2) move caliper support housing assemblies having the brake contact caliper assemblies pivotally connected thereto to achieve a dual pivotal action of the brake pad members to achieve a most efficient braking operation.

18 Claims, 3 Drawing Sheets

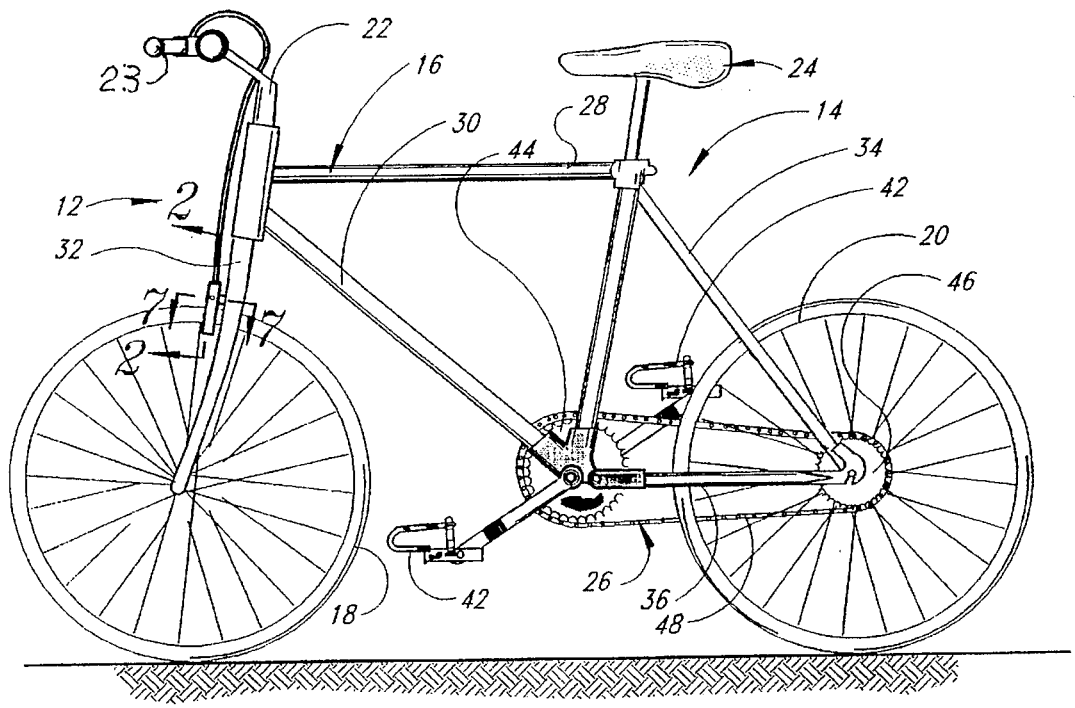
Fig. 1
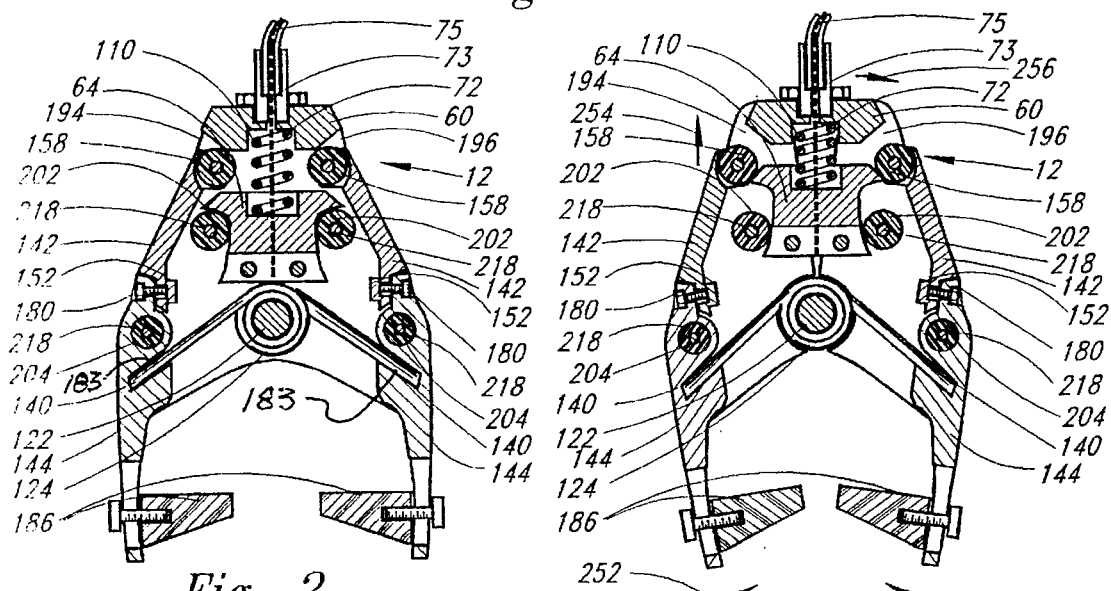
Fig. 2
Fig. 3

CENTER PULL BICYCLE BRAKE ASSEMBLY

PRIOR ART

A patent search revealed the following United States patents:

| U.S. Pat. No. | Invention | Inventor |
|---|---|---|
| 4,391,352 | BRAKE SYSTEM AND APPARATUS AND METHOD THEREOF | Lawrence G. Brown |
| 4,552,251 | CYCLE WHEEL RIM BRAKE CONSTRUCTION | Robert Schoch |
| 4,765,443 | CALIPER BRAKE FOR MOUNTAIN BICYCLES HAVING WIDE TIRES | Charles B. Cunningham |
| 4,869,351 | GOLF BALL SETTER | Salvatore Milano |
| 5,299,664 | BICYCLE BRAKE ASSEMBLY INCLUDING CRANK ARM LEVERS WHICH FUNCTION AS SECOND CLASS LEVERS | Jack Peters |

Additionally, the following foreign patents were found:
Patent No.
EP 23,414
GB 648,040
GB 676,463

The search was conducted on a center pull bicycle brake assembly having streamlined monocoque construction of aerodynamic design and deriving strength from its outer housing. Another unique feature is the use of dual pivoting brake calipers actuated by brake cam action and pivotal movement of the outer housing.

ANALYSIS

Numerous center pull bicycle brake assemblies are noted in the search along with linkage type and cam actuated brake systems.

The Brown patent discloses a brake system utilizing a side mount cable system and using a parallelogram linkage system to move caliper arms to a braking condition.

The Schoch patent discloses a cycle wheel rim brake construction which is a center pull system used with brake caliper arms.

The Cunningham patent and European Patent No. EP 23,414 disclose a center pull cam member to move upper ends of caliper arms into a bicycle braking condition. The Cunningham patent further discloses use of linear wire springs to bias caliper arms into a non-braking condition.

The Romano patent discloses a bicycle brake of the center-pull type utilizing a parallelogram type linkage system.

The Milano patent discloses a golf ball setter having a center pull caliper type structure comprising a wedge to contact rollers connected to a caliper.

The Peters patent discloses a bicycle brake assembly including crank arm levers which function as second class levers which are pivotal about respective bolts. The crank arm levers are of generally V-shape having rollers thereon to contact upper ends of caliper arms for movement to a braking function. A tension spring member is connected to a mid-portion of the caliper arms to bias towards a brake released condition.

The Great Britain Patent Nos. 648,040 and 676,463 disclose center pull brake structures utilizing spring members and a cam member to position caliper arms in a braking operation.

PRIOR ART HISTORY

Various types of bicycle brake assemblies are known in the prior art such as 1) a side pull bicycle brake assembly; 2) a cantilever bicycle brake assembly; and 3) the center pull bicycle brake assembly.

The side pull bicycle brake assembly can either be of a single pivot type whereupon the brake cantilever arms are pivoted through use of a brake cable about a single pivot point to apply brake pads against a bicycle tire.

Another embodiment of the side pull bicycle brake assembly utilizes a pair of dual pivoting points about which the brake cantilever arms will pivot brake pads moved inwardly to apply pressure on a bicycle tire.

The cantilever bicycle brake assembly utilizes a brake cable attached to a common brake actuator cable whereupon movement thereof causes a pair of brake cantilevers to pivot about a respective post on a bicycle frame to apply bicycle brake pads against a bicycle tire. This type of bicycle brake assembly has poor aerodynamic characteristics; requires a cable hanger assembly; and a requires a cantilever post mounted on the bicycle frame for pivotal movement thereabout.

The center pull bicycle brake assembly utilizes a bicycle cable with movement thereof to pivot brake caliper arms about a respective single pivot point.

The invention herein is a center pull bicycle brake assembly type having substantial improvements in operation over the prior art center pull bicycle brake assemblies as will be explained.

PREFERRED EMBODIMENT OF THE INVENTION

In one preferred embodiment of this invention, a center pull bicycle brake assembly is provided which is normally attached on a racing bicycle assembly due to superior aerodynamic characteristics and efficient dual pivoting braking operation.

More specifically, the center pull bicycle brake assembly is mounted on a front fork member of the racing bicycle assembly and operable to selectively apply brake pressure against a front tire member. The center pull bicycle brake assembly uses a cable member operable through a brake cable handle member to apply pressure of brake pads against the front tire member in a braking operation.

The center pull bicycle brake assembly includes 1) a cable connector and cam actuator assembly; 2) a main support and pivot axle assembly connected to the cable connector and cam actuator assembly; 3) a pair of brake contact caliper assemblies engageable and movable by the cable connector and cam actuator assembly; 4) a pair of caliper support housing assemblies connected to respective ones of the brake contact caliper assemblies; and 5) a pair of exterior cover plate assemblies connected to respective ones of the caliper support housing assemblies.

The cable connector and cam actuator assembly includes 1) a cable receiver housing member; 2) a guide and anchor assembly connected to the cable receiver housing member; and 3) a cam actuator assembly connected to the cable receiver housing member.

The cable receiver housing member is provided with a cable anchor barrel to receive an actuator cable member therethrough and allow axial movement thereof in a brake actuating function as will be explained.

The guide and anchor assembly includes a main anchor section integral with an actuator guide section. The main anchor section is connected to the main support and pivot axle assembly. The cam actuator assembly is slidably connected to the actuator guide section.

The cam actuator assembly includes a cam actuator body member having a cable connector assembly connected thereto. The cable connector assembly is utilized to anchor one end of the actuator cable member thereto in order to selectively move the cam actuator body member during a braking operation.

The cam actuator body member is provided with first cam surfaces and second cam surfaces operable to provide conjoint pivotal movement of 1) the brake contact caliper assemblies; and 2) the caliper support housing assemblies in a novel manner as will be explained.

The main support and pivot axle assembly includes 1) a main support axle member secured in a firm supporting manner to a front fork member on the racing bicycle assembly through a lock nut member; and 2) a centering spring member is mounted about the main support axle member and being operable to bias a portion of the respective brake contact caliper assemblies to a non-braking or inactive position as will be explained.

The brake contact caliper assemblies are identical being a left and right side thereof, each containing 1) a cam actuated caliper member engageable and movable by the cam actuator assembly in the cable connector and cam actuator assembly; and 2) a brake contact caliper member being pivotally connected to the cam actuated caliper member and engageable through a brake pad member with the front tire member on the racing bicycle assembly in a bicycle braking operation.

Each cam actuated caliper member is pivotally connected to one of the caliper support housing assemblies and the respective brake contact caliper member. Further, each cam actuated caliper member is provided with a roller member which is engageable with the movable cam actuated body member on the cam actuator assembly so as to be pivotal to a braking function position on movement of the actuator cable member as will be explained.

Each brake contact caliper member includes a main brake caliper housing with a pivot connector section and a brake connector section having a brake pad assembly connected thereto.

Each pivot connector section is provided with a pivot connection to a respective one of the cam actuated caliper members and having an adjustment member thereon which is engageable with a portion of the cam actuated caliper member. This adjustment feature provides adjustment of a brake pad member of the brake pad assembly relative to the front tire member providing an adjustable feature to achieve maximum efficiency during the braking function and operation of this invention.

The caliper support housing assembly includes 1) a first caliper housing assembly mounted about the main support axle member and operably connected to a left one of the brake contact caliper assemblies; and 2) a second caliper housing assembly pivotally mounted about the main support axle member and operably connected to the fight one of the brake contact caliper assemblies.

Each of the first and second caliper housing assemblies are provided with a caliper housing member having a cam contact lug and a caliper pivot lug to cause pivotal movement of the respective first and second caliper housing assemblies and control movement of the brake contact caliper assemblies during a braking operation.

Each of the first and second caliper housing assemblies are supported on and pivotal about the main support axle member.

The exterior cover plate assemblies are provided with two thereof having a first cover member and a second cover member. The first and second cover members are substantially identical and are secured as by anchor members to threaded openings in the cam contact lugs and the caliper pivot lugs to provide enclosure and sealing cover members thereto.

The center pull bicycle brake assembly of this invention provides a pair of brake contact caliper assemblies comprising dual pivoting brake contact caliper members being attached to the respective first and second caliper housing assemblies and pivoted by a cam actuator assembly to provide a dual pivoting action about the single main support axle member.

OBJECTS OF THE INVENTION

One object of this invention is to provide a center pull bicycle brake assembly which is readily attachable to existing bicycle assemblies with a minimum amount of tools and skill required to do so.

Another object of this invention is to provide a center pull bicycle brake assembly which is readily connected to a front fork member of a bicycle assembly and having new and novel brake contact caliper assemblies of a dual pivot type with a new and unique pivoting action to achieve a highly efficient braking action through clamping of a front bicycle tire member between cooperating bicycle brake pads.

One other object of this invention is to provide a center pull bicycle brake assembly having pivoting brake contact caliper assemblies operable through a dual, cable actuated, cam actuation to cause a dual pivoted action of brake contact caliper members and a caliper support housing assembly to achieve a new and unique bicycle braking operation.

A further object of this invention is to provide a center pull bicycle brake assembly having a monocoque construction in that it derives its strength from its skin or caliper support housing assemblies and provides a new and novel efficient aerodynamic profile which is desired on a racing bicycle assembly.

One further object of this invention is to provide a center pull bicycle brake assembly easily mountable on a racing bicycle assembly and having means thereon for ready adjustment of a brake contact caliper assembly which is important in achieving overall maximum efficiency during a racing bicycle assembly braking function.

Still, one other object of this invention is to provide a center pull bicycle brake assembly which is easy to install on new and used bicycle assemblies with a minimum amount of tools and skill required; economical to manufacture; easy to achieve a braking adjustment on individual and selective movement of braking pad members; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a side elevational view of a bicycle assembly having the center pull bicycle brake assembly of this invention mounted thereon for a braking operation with a front tire member;

FIG. 2 is a enlarged fragmentary sectional view taken along line 2—2 in FIG. 1 illustrating a non-braking condition;

FIG. 3 is a view similar to FIG. 2 illustrating operation thereof in a braking condition;

Figure 4:
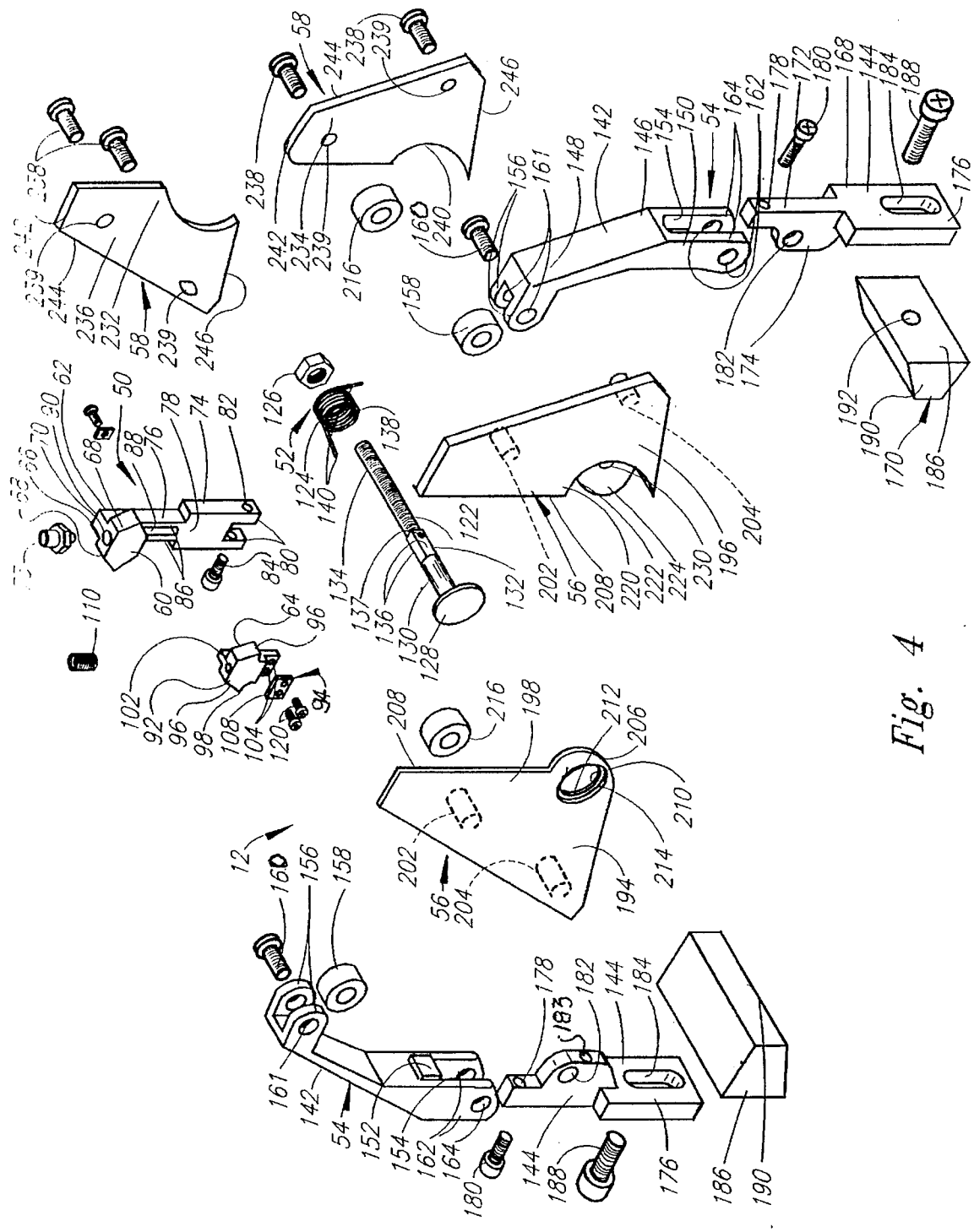
FIG. 4 is an exploded perspective view of the center pull bicycle brake assembly of this invention.

The following is a discussion and description of preferred specific embodiments of the center pull bicycle brake assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a center pull bicycle brake assembly of this invention, indicated generally at 12, is shown as attached to a racing bicycle assembly 14.

The racing bicycle assembly 14 is of a conventional nature including 1) a main bicycle frame assembly 16; 2) a front wheel member 18 with a front tire member 19 mounted thereon; 3) a rear wheel member 20; 4) a guide handlebar member 22; 4) a support seat member 24; and 5) a power chain drive assembly 26.

The main bicycle frame assembly 16 includes 1) a horizontal support member 28; 2) an inclined support member 30; 3) a front fork member 32 interconnected to the horizontal support member 28 and the inclined support member 30; 4) a rear fork member 34 operably connected to a rear portion of the horizontal support member 28; and 5) a wheel support member 36 interconnected from the inclined support member 30 into a portion of the power chain drive assembly 26.

The guide handlebar member 22 is of a conventional nature operable to receive and support a brake actuator handle assembly 23 thereon which is operable in a conventional grasping, clamping member to move an actuator cable member longitudinally within a stationary housing in a braking function.

The power chain drive assembly 26 is of a known construction having a pair of pedal members 42 operable to receive a person's foot thereon for rotating a main sprocket member 44 to drive a driven sprocket member 46 through a drive chain member 48 in a conventional manner.

The center pull bicycle brake assembly 12 includes 1) a cable connector and cam actuator assembly 50; 2) a main support and pivot axle assembly 52 which is anchored to the racing bicycle assembly 14 and connected to the cable connector and cam actuator assembly 50; 3) a pair of brake contact caliper assemblies 54 which are engageable by the cable connector and cam actuator assembly 50 in a braking operation; 4) a caliper support housing assembly 56 being connected to respective ones of the brake contact caliper assemblies 54 and pivotal therewith; and 5) an exterior cover plate assembly 58 connected to the caliper support housing assembly 56 to provide an enclosure and sealing structure for the other elements of the center pull bicycle brake assembly 12.

The cable connector and cam actuator assembly 50 includes 1) a cable receiver housing member 60; 2) a guide and anchor assembly 62 connected to the cable receiver housing member 60; and 3) a cam actuator assembly 64 operably connected to the cable receiver housing member 60 and movable on actuation of a brake actuator cable member as will be noted.

The cable receiver housing member 60 includes 1) a top wall 66; 2) a pair of opposing inclined side walls 68; 3) a central threaded opening 70; 4) a cable receiving hole 72; 5) a cable anchor barrel 73; and 5) an actuator cable member 75 mounted within the cable anchor barrel 73.

The cable anchor barrel 73 is threadably mounted within the central threaded opening 70 and the actuator cable member 75 trained therethrough for attachment to the cam actuator assembly 64 to cause movement thereof on axial movement of the actuator cable member 75 in a manner to be explained.

The guide and anchor assembly 62 includes a main anchor section 74 secured to the cable receiver housing member 60 and having an integral actuator guide section 76.

The main anchor section 74 is provided with a support body portion 78 integral with a pair of spaced parallel anchor leg portions 80, each having a connector hole 82 therein aligned with each other and provided with an anchor member 84 being a threaded bolt member for interconnection to the main support and pivot axle assembly 52 as will be explained.

The actuator guide section 76 is provided with guide support leg portions 86 integral with a top portion of the support body portion 78 and having a central guide slot 88 and an upper connector portion 90 which is integral with the cable receiver housing member 60.

As shown in FIG. 4, the cam actuator assembly 64 includes a cam actuator body member 92 having connected thereto a cable connector assembly 94. The cam actuator body member 92 is provided with 1) upper spaced first cam surfaces 96 and lower second cam surfaces 98; 2) a cable mount hole 102; and 3) guide connector holes 104 being of a threaded type to receive the cable connector assembly 94 connected thereto as will be noted.

The cable connector assembly 94 includes an anchor plate member 108 and a retractor spring member 110. The anchor plate member 108 is provided with anchor members 120, being bolt members, mounted in the guide connector holes 104 to secure the anchor plate member 108 about a lower anchor portion of the actuator cable member 75.

The retractor spring member 110, as best noted in FIGS. 2 and 3, is mounted about a portion of the anchor cable member 75 and mounted in recessed openings in an upper portion of the cam actuator body member 92 and a lower portion of the cable receiver housing member 60.

The main support pivot and axle assembly 52 includes 1) a main support axle member 122 which provides a main pivot and support element for the entire center pull bicycle brake assembly 12; 2) a centering spring member 124 operable to be mounted about the main support axle member 122; and 3) a lock nut member 126 operable to be attached to an outer threaded end of the main support axle member 122 as will be explained.

Figure 7:
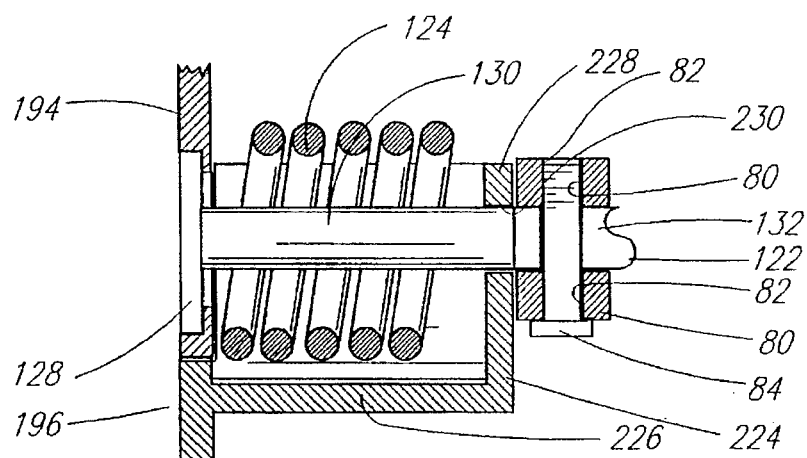
FIG. 7 is an enlarged fragmentary sectional view taken along line 7—7 in FIG. 1.

As collectively shown in FIGS. 4 and 7, the main support axle member 122 includes an outer head section 128 which is integral with a first cylindrical section 130 which, in turn, is integral with a mid anchor section 132 and ending in an outer threaded end section 134. The first cylindrical section 130 is operable as a spring support section to receive and support the centering spring member 124.

The mid anchor section 132 is of square or rectangular shape in transverse cross section and provided with outer flat wall portions 136 and having an anchor hole 137 therethrough to receive the anchor member 84 of the main anchor section 74 therein on securing to the cable connector and cam actuator assembly 50.

The outer threaded end section 134 is operable to receive the lock nut member 126 thereon in the assembled condition on being connected to the front fork member 32 of the racing bicycle assembly 14.

More specifically, the outer threaded end section 134 is operable to be received within a hole on the front fork member 32 of the main bicycle frame assembly 16 when anchored thereto in the condition as noted in FIG. 1.

As shown in FIG. 4, the centering spring member 124 includes a central coil spring section 138 having, at outer ends thereof, laterally extended outer connector members 140 operable to move the brake contact caliper assembly 54 from the braking condition of FIG. 3 to the non-braking condition of FIG. 2 due to the outward spring movement of the outer connector members 140.

As best noted in FIG. 4, the brake contact caliper assemblies 54, being two thereof, each include 1) a cam actuated caliper member 142; and 2) a brake contact caliper member 144 being pivotally connected and adjustable relative to the cam actuated caliper member 142.

Each cam actuated caliper member 142 includes a main caliper housing 146 having 1) a cam roller section 148; 2) a pivot connector section 150 integral with the cam roller section 148; 3) a pivot adjustment plate 152 connected to an inner portion of the pivot connector section 150; and 4) a brake caliper access slot 154 operable to receive a portion of the brake contact caliper member 144 therein as will be noted.

Each cam roller section 148 includes a pair of adjacent spaced roller support lugs 156, each having a connector hole 161 therein being aligned with each other.

The cam roller section 148 further includes a roller member 158 rotatably mounted on a roller support shaft or bolt 160 which has been operable to be placed within the connector holes 161 anchored by the threaded roller support shaft or bolt 160.

The pivot connector assembly 150 includes a pair of spaced pivot support lugs 162, each having a pivot connector hole 164 aligned with each other for connection to the brake contact caliper member 144 as will be noted.

The pivot adjustment plate 152 is operable to receive contact from an adjusting member which is part of the brake contact caliper member 144. This provides for respective individual fine tuning adjustment of each brake contact caliper member 144 relative to a bicycle tire member as will be explained.

Each brake contact caliper member 144 includes 1) a main brake caliper housing 168; and 2) a brake pad assembly 170 connected to outer ends of the main brake caliper housing 168. Each brake caliper housing 168 includes 1) an adjustment end section 172; 2) a mid pivot connector section 174 integral with the adjustment end section 172; and 3) a brake connector section 176 integral with an outer end of the mid pivot connector section 174.

As shown in FIG. 4, the adjustment end section 172 is provided with a threaded adjustment opening 178 having an adjustment member 180 mounted therein for a braking adjustable feature as will be noted.

The mid pivot connector section 174 includes a pivot hole 182 and a spring receiver slot or opening 183 to receive one respective outer connector member 140 of the centering spring member 124 as noted in FIG. 3. The pivot hole 182 is operable to be aligned with the pivot connector holes 164 in the pivot support lugs 162 and mounted about a caliper pivot lug as will be explained.

The brake connector section 176 is provided with a brake pad adjustment slot 184 to adjustably receive the brake pad assembly 170 connected thereto.

As noted in FIG. 4, the brake pad assembly 170 is provided with a brake pad member 186 which is secured by a pad anchor member 188 being a threaded bolt member for connection to the brake connector section 176. More specifically, each brake pad member 186 is provided with a bicycle tire contact section 190 and having a pad anchor hole 192 therein.

The pad anchor hole 192 is threaded and operable to receive the threaded pad anchor member 188 therein for anchoring to the brake connector section 176. Each pad anchor member 188 is vertically movable within the respective brake pad adjustment slot 184 to provide adjustment for braking against the front tire member 19 on the front wheel member 18 in a conventional braking operation.

The caliper support housing assembly 52, being two thereof, each include 1) a first caliper housing assembly 194; and 2) a second caliper housing assembly 196. The caliper housing assemblies 194, 196 are substantially similar but having a slight structural change in the second caliper housing assembly 196 as will be noted.

As shown in FIG. 4, the first caliper housing assembly 194 includes 1) a main caliper housing member 198; 2) a cam contact lug 102; and 3) a caliper pivot lug 204 which, in conjunction with the cam contact lug 102, is secured to an inner surface of the main caliper housing member 198.

The main caliper housing member 198 is provided with a circular connector section 206 having a stepped axle connector opening 210 and an abutment edge wall 208.

The stepped axle connector opening 210 is provided with an axle hole 212 and a stepped opening 214 (FIG. 4). The axle hole 212 is operable to receive the outer head section 128 of the main support axle member 122 therein as best shown in FIG. 7.

The abutment edge wall 208 is operable to contact a similar wall on the second caliper housing assembly 196 as will be noted.

The cam contact lug 202 is provided with a roller member 216 to be mounted thereabout and having a cover anchor hole 218. The caliper pivot lug 204 is also provided with a cover anchor hole 218 therein (FIGS. 2 and 3).

As shown in FIG. 4, the second caliper housing assembly 196 is provided with 1) a primary caliper housing member 220; 2) one of the cam contact lugs 202; and 3) one of the caliper pivot lugs 204 which, in conjunction with the cam contact lug 202, is connected to an inner surface of the primary caliper housing member 220. The primary caliper housing member 220 is provided with a circular receiver section 222 having one abutment edge wall 208 and an offset connector section 224. As best shown in FIG. 7, the offset connector section 224 is provided with an anchor wall portion 226 connected to an axle receiver arm 228. The axle receiver area 228 is provided with an axle receiver hole 230 to receive the main support axle member 122 therethrough.

The cam contact lug 202 is as previously described having the roller member 216 and the cover anchor hole 218 therein. The caliper pivot lug 204 is as previously described having the cover anchor hole 218 therein (See FIGS. 2 and 3).

The exterior cover plate assembly 58 includes 1) a first cover member 232; and 2) a second cover member 234. The first cover member 232 is provided with a cover body section 236 associated with cover anchor members 238 being bolt members which are mounted within respective ones of anchor holes 239 for securing to the cam contact lugs 202 or the caliper pivot lugs 204.

The cover body section 236 is provided with 1) a circular cut-out portion 240; 2) an upper wall portion 242; 3) an inclined side wall portion 244; and 4) a lower inclined portion 246.

The first and second cover members 232, 234 are substantially identical but reversed and are operable to be associated with respective ones of the first caliper housing assembly 194 and the second caliper housing assembly 196.

USE AND OPERATION OF THE INVENTION

In the use and operation of the center pull bicycle brake assembly 12 of this invention, it is primarily intended to be utilized on a racing bicycle assembly 14 as designed having an outer aerodynamic contour with the outer caliper support housing assembly 56 to provide a minimum amount of air resistance and maximum air flow to benefit a bicycle racing participant.

The center pull bicycle brake assembly 12 is readily connected to the front fork member 32 on the racing bicycle assembly 14 by insertion of an outer end of the main support axle member 122 through a hole in the front fork member 32 and secured as by a nut member thereto in a position as noted in FIG. 1.

More particularly, the brake contact caliper members 144 are placed about and on outer respective sides of the front tire member 19 being part of the front wheel member 18.

The actuator cable member 75 is trained from the cable receiver housing member 60 upwardly and attached to the brake actuator handle member 23 on the guide handlebar member 22. The brake actuator handle member 23 is moved by a user thereof in a conventional hand squeezing operation in order to move the actuator cable member 75 axially and upwardly for operation in a conventional bicycle braking operation.

Once the center pull bicycle brake assembly 12 is mounted on the racing bicycle assembly 14, the brake pad members 186 on each of the brake pad assemblies 170 can be movable vertically within the respective brake pad adjustment slot 184. Each brake pad member 186 can be anchored in a proper adjusted position relative to side wall of the front tire member 19 through use of the respective pad anchor members 188 to hold in a vertically adjusted position.

Figure 5:
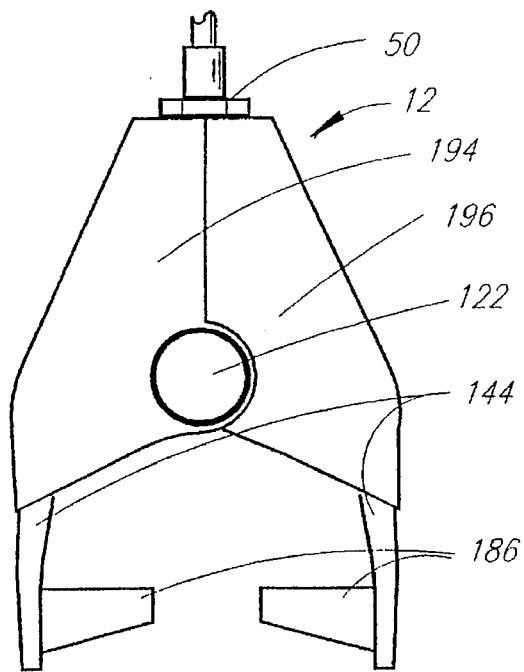
FIGS. 5 and 6 are front elevational views thereof in the respective non-braking and braking conditions.

Next, the user thereof would utilize the adjustment members 180 of the respective brake contact caliper members 144 to move the respective brake pad members 186 inwardly towards a contact surface on the front tire member 19. This can place the respective brake pad members 186 adjacent the contact surface on the front tire member 19 but slightly spaced therefrom. This positioning of an inner surface of the brake pad members 186 would obtain the highest braking efficiency on actuation of the center pull bicycle brake assembly 12 in a conventional manner due to squeezing of the brake actuator handle. This adjusted but non-braking condition is clearly shown in FIGS. 2 and 5.

As noted in FIG. 3, operation of the brake actuator handle member 23 causes the actuator cable member 75 to move longitudinally as indicated by an arrow 254 in FIG. 3. This causes an upward movement of the cam actuator body member 92 which causes contact between the first cam surfaces 96 and the roller members 158 and, concurrently, contact between the second cam surfaces 98 with the cam contact lugs 202. This causes concurrent outward movement of the cam actuated caliper member 142 as noted by an arrow 256.

Concurrently, this braking operation causes an inward movement of the brake pad members 186 as noted by an arrow 252 in FIG. 3 on pivotal movement of the brake contact caliper members 144.

Figure 6:
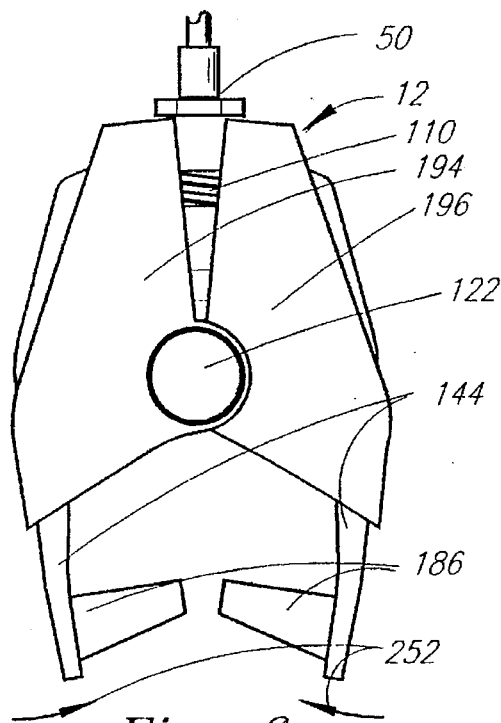

At the time of the pivotal movement as noted by the arrows 252, 256 of the brake contact caliper assemblies 54, it is obvious that we have a dual action pivotal movement as the respective first and second caliper housing assemblies 194, 196 are pivoted inwardly while the first caliper housing assembly 194 and the second caliper housing assembly 196 are pivoted outwardly as noted in FIGS. 3 and 6.

This dual pivoting action and movement provides a higher degree of braking efficiency which is a primary concern in a racing function with the racing bicycle assembly 14.

This dual pivotal movement is clearly illustrated in FIG. 3 whereupon the caliper pivot lugs 204, the cam contact lugs 202, and the roller members 158 are noted to be moved outwardly relative to the rotatable main support axle member 122 during a braking operation.

The center pull bicycle brake assembly 12 of this invention provides a streamlined aerodynamically racing brake structure which is readily mountable on existing racing bicycle assemblies with a minimum amount of tools and skill required. Further, the center pull bicycle brake assembly 12 is easily adjustable relative to the front tire member 19 so as to achieve the most efficient and effective braking function.

The center pull bicycle brake assembly is economical to manufacture; readily installed on new or existing racing bicycle assemblies with a minimum amount of tools and skills required; aerodynamically designed for maximum efficiency; and substantially maintenance free.

While the invention has been described in conjunction with preferred specific embodiments thereof, it will be understood that this description is intended to illustrate and not to limit the scope of the invention, which is defined by the following claims:

I claim:

1. A center pull bicycle brake assembly operable to apply a braking force to a tire member on a bicycle assembly, comprising:
    a) a cable connector and cam actuator assembly includes a cam actuator assembly connected to an actuator member;
    b) said actuator member selectively movable to move said cam actuator assembly in a braking operation;
    c) a main support member connected to a portion of a bicycle assembly;
    d) a brake contact caliper assembly which is pivotally connected to a caliper support housing which is pivotally connected to said main support member; and
    e) said cam actuator assembly moved during the braking operation and operable to contact and pivotally move said brake contact caliper assembly and said caliper support housing and cause a dual pivoting brake action of said brake contact caliper assembly.

2. A center pull bicycle brake assembly as described in claim 1, wherein:
    a) said brake contact caliper assembly having a cam actuated caliper member operably connected to said cam actuator assembly;

b) said brake contact caliper assembly having a brake contact caliper member pivotally connected to said cam actuated caliper member and said caliper support housing; and c) said brake contact caliper assembly adjustably connected to said cam actuated caliper member to selectively adjust the braking operation.

3. A center pull bicycle brake assembly as described in claim 1, wherein:

a) said brake contact caliper assembly which is pivotally connected and movable about a pivot point on said caliper support housing and said brake contact caliper assembly is pivotal about said main support member and said pivot point on said caliper support housing during a braking operation to achieve a more efficient and effective dual pivoting operation thereof.

4. A center pull bicycle brake assembly as described in claim 1, including:

a) a bias member mounted about said main support member and engageable with said brake contact caliper assembly and being operable to hold said brake contact caliper assembly out of engagement with a tire member in a non-braking condition and operable to return said brake contact caliper assembly to the non-braking condition after a braking operation.

5. A center pull bicycle brake assembly as described in claim 1, wherein:

a) said cable connector and cam actuator assembly includes a bias member engageable with said cam actuator assembly to bias same in a released condition and return same to the released condition after the braking operation.

6. A center pull bicycle brake assembly as described in claim 1, wherein:

a) said brake contact caliper assembly includes 1) a first portion engageable with said cam actuator assembly to cause pivotal movement about said caliper support housing; and 2) a second portion pivotal about said main support member and movable with said caliper support housing on engagement with said cam actuator assembly.

7. A center pull bicycle brake assembly as described in claim 1, wherein:

a) said first portion adjustably connected to said second portion.

8. A center pull bicycle brake assembly as described in claim 1, wherein:

a) said cam actuator assembly includes 1) a first cam surface engageable with said brake contact caliper assembly to cause pivotal movement about said caliper support housing; and 2) a second cam surface engageable with said caliper support housing to cause pivotal movement thereof about said main support member to cause an increased dual braking action.

9. A center pull bicycle brake assembly adapted to be connected to a fork member adjacent a rotatable tire member mounted on a wheel member connected to racing bicycle assembly, comprising:

a) a main support member connected to a fork member on a bicycle assembly;

b) a cable connector and cam actuator assembly connected to said main support member and having a cam actuator assembly connected to an actuator cable member; and movement of said actuator cable member in a braking operation causes concurrent movement of said cam actuator assembly;

c) a first caliper housing assembly pivotally connected to said main support member;

d) a brake contact caliper assembly pivotally connected to said first caliper housing assembly and selectively engageable with a rotatable tire member during the braking operation; and e) said cam actuator assembly moved in the braking operation to conjointly move said first caliper housing assembly about said main support member and said brake contact caliper assembly about said first caliper housing assembly to achieve a dual pivoting movement of said brake contact caliper assembly which contacts the tire member to decrease rotation thereof in the braking operation.

10. A center pull bicycle brake assembly as described in claim 9, wherein:

a) said cam actuator assembly having first and second cam surfaces thereon;

b) said first cam surface engageable with said brake contact caliper assembly to pivot same about said first caliper housing assembly during a braking operation; and c) said second cam surface engageable with a portion of said first caliper housing assembly operable to cause pivotal movement thereof during a braking operation about said main support member to achieve the dual pivoting function during a braking operation.

11. A center pull bicycle brake assembly as described in claim 9, wherein:

a) said brake contact caliper assembly having a cam actuated caliper member pivotally connected to said first caliper housing assembly and a brake contact caliper member pivotally connected to said cam actuated caliper member and said first caliper housing assembly; and b) said brake contact caliper member adjustably connected to said cam actuated caliper member and having an outer brake pad assembly selectively engageable to the rotatable tire member in a braking operation.

12. A center pull bicycle brake assembly as described in claim 11, wherein:

a) said cam actuated caliper member having a pivot adjustment plate mounted thereon;

b) said brake contact caliper assembly having an adjustment member engageable with said pivot adjustment plate and operable to pivot said brake contact caliper member in an adjustment operation to increase or decrease a speed of braking during the braking operation.

13. A center pull bicycle brake assembly as described in claim 9, including:

a) a second caliper housing assembly connected to said main support member;

b) a second brake contact caliper assembly connected to said second caliper housing assembly; and c) said first and second brake contact caliper assemblies pivotally operable during braking operation about said respective first and second caliper housing assemblies to cause contact of a portion of said brake contact caliper members with the rotatable tire member in a braking operation.

14. A center pull bicycle brake assembly as described in claim 9, including:

a) a bias member mounted about said main support member and engageable with said brake contact caliper assembly and being operable to hold said brake contact caliper assembly out of engagement with the rotatable tire member in a non-braking condition and operable to return said brake contact caliper assembly to the non-braking condition after a braking operation.

15. A center pull bicycle brake assembly as described in claim 9, wherein:

a) said cable connector and cam actuator assembly includes a bias member engageable with said cam actuator assembly to bias same in a released condition and return same to the released condition after the braking operation.

16. A brake assembly operable to apply a braking force to a rotatable member, comprising:

a) a primary support member mounted adjacent a rotatable member;

b) a connector and actuator assembly connected to said primary support member having an actuator assembly selectively movable during a braking operation;

c) a support housing assembly pivotally connected to said primary support member;

d) a brake contact assembly pivotally connected to said support housing assembly, engageable with said actuator assembly, and engageable with the rotatable member during the braking operation; and e) said actuator assembly movable and operable in a braking operation to pivot said brake contact assembly about said support housing assembly conjointly with pivotal movement of said support housing assembly about said primary support member;

whereby a dual pivoting movement of said brake contact assembly operates to achieve a braking function against the rotatable member.

17. A brake assembly as described in claim 16, wherein:

a) said brake contact assembly having an actuated caliper member and a brake contact caliper member pivotally and adjustably connected to said actuated caliper member and said support housing assembly; and b) said brake contact caliper member having an outer brake pad assembly connected thereto and engageable with the rotatable member during the braking operation.

18. A brake assembly as described in claim 16, wherein:

a) said support housing assembly having a first caliper housing assembly and a second caliper housing assembly; and b) said brake contact assembly having two thereof with one pivotally connected to said first caliper housing assembly and the other pivotally connected to said second caliper housing assembly.

* * * * *